United States Patent [19]

Grimminger et al.

[11] 4,274,499

[45] Jun. 23, 1981

[54] PROCESS AND DEVICE FOR CONTROLLING THE CONTENT OF CLOSED PACKAGES AS TO COMPLETENESS

[75] Inventors: Hermann Grimminger, Hofheim; Hans-Joachim Reimer, Kelkheim, both of Fed. Rep. of Germany

[73] Assignee: Hoechst Aktiengesellschaft, Frankfurt, Fed. Rep. of Germany

[21] Appl. No.: 11,942

[22] Filed: Feb. 13, 1979

[30] Foreign Application Priority Data

Feb. 15, 1978 [DE] Fed. Rep. of Germany ....... 2806281

[51] Int. Cl.[3] ............................................ G01G 15/00

[52] U.S. Cl. .......................................... 177/1; 53/53; 53/502; 177/50; 209/594

[58] Field of Search ............... 209/592, 593, 594, 595; 53/502, 507, 508, 53; 177/1, 16, 50, 200, 199, 145

[56] References Cited

U.S. PATENT DOCUMENTS

| | | | |
|---|---|---|---|
| 2,576,468 | 11/1951 | Martin | 177/199 X |
| 2,868,535 | 1/1959 | Ruge | 177/134 X |
| 3,182,737 | 5/1965 | Monsees | 177/45 |

*Primary Examiner*—Joseph W. Hartary

*Attorney, Agent, or Firm*—Curtis, Morris & Safford

[57] ABSTRACT

To control the completeness of the content which is not fixed in a package, the package is brought in an inclined position. In the case of incomplete packing, the content slides in the package whereby the distribution of weight changes, which change is measured.

For safety, the package can then be inclined in opposite direction, whereupon the distribution of weight is measured again and the two values obtained are compared.

6 Claims, 2 Drawing Figures

PROCESS AND DEVICE FOR CONTROLLING THE CONTENT OF CLOSED PACKAGES AS TO COMPLETENESS

This invention relates to a process and a device for controlling as to completeness the content of closed packages wherein a plurality of packed articles are distributed over the volume of the package and not fixed therein.

In the packing process, especially machine packing, the content of the package is inserted or pushed in at optimum speed. Immediately after this procedure the package is closed. Due to the high packing speed, especially of modern packaging lines, faulty operations cannot be avoided and, as a result, the package content is often incomplete.

It is known to determine the completeness of a package by weighing. But this method cannot be used with packages where the weight of the missing article is within the tolerable differences in weight of the packing material plus the content, for example with cardboard boxes containing glass bottles where the dosing spoons are missing.

It is the object of the present invention to provide a process for controlling as to completeness the content of closed packages wherein a plurality of packed articles are distributed over the volume of the package and not fixed therein, which comprises bringing the package in inclined position and measuring the distribution of weight in the package. In this manner missing articles can be ascertained.

The process of the invention makes it possible to control as to completeness the content of closed packages containing a plurality of individual articles distributed over the volume of the package. On principle, it is immaterial whether the packed articles are alike or different as regards mass, shape and size. The process of the invention proves to be especially advantageous for the control of the completeness of packages wherein the individual articles of differing mass are asymmetrically distributed in the package.

Figure 1:
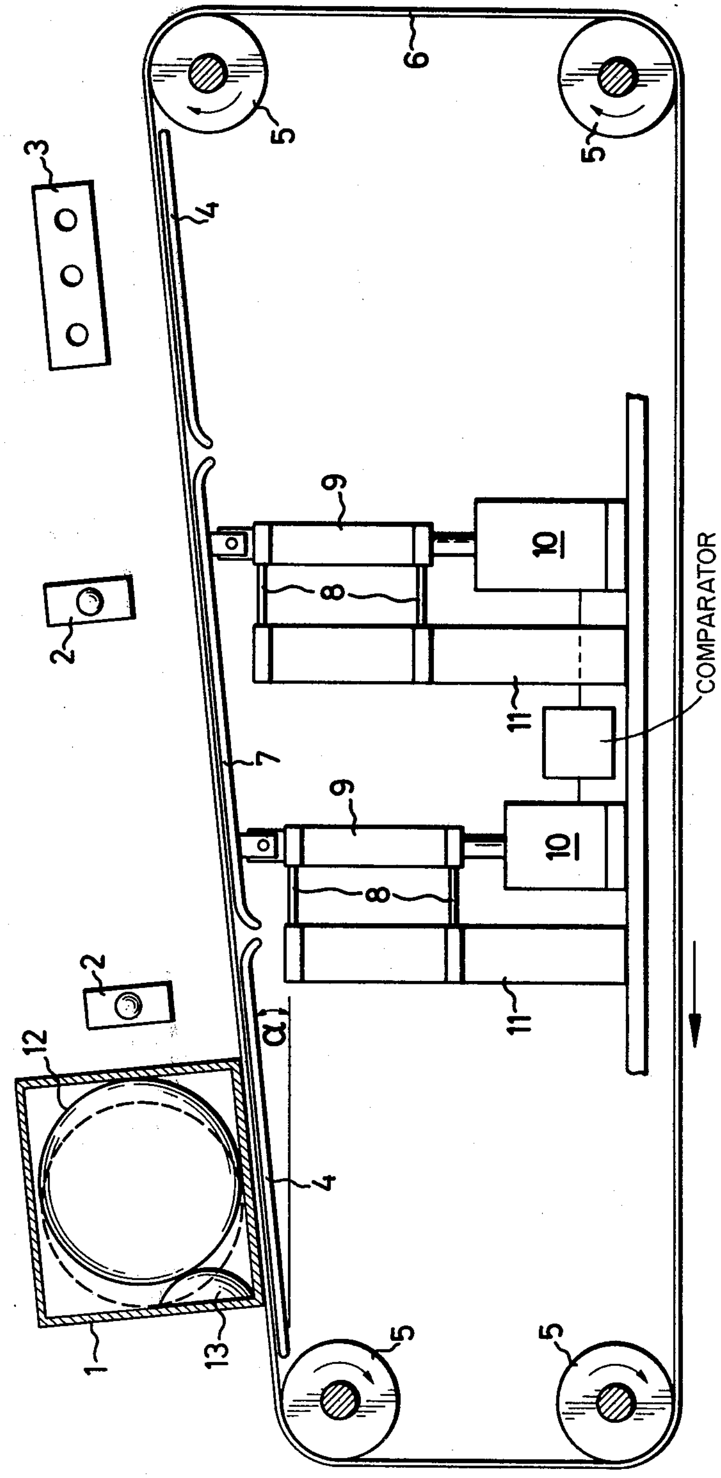
Figure 2:
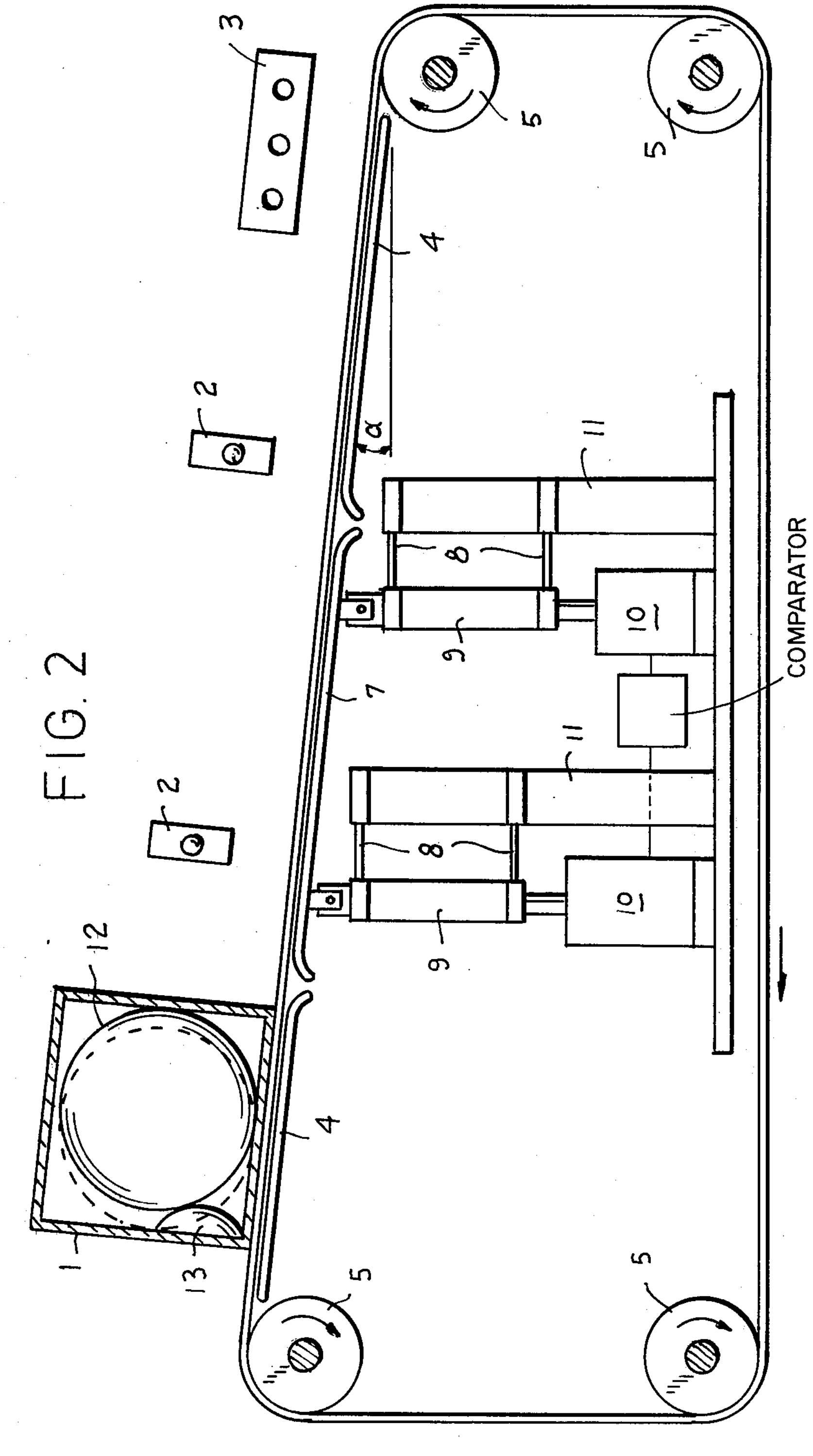

The invention will now be described in further detail with reference to the accompanying drawings, wherein FIG. 1 illustrates, by way of example, a device to control as to completeness the content of packages; and FIG. 2 illustrates a similar device wherein the support surface is inclined in the opposite direction.

A conveyor (6) inclined in the direction of motion, for example an endless belt driven by driving rolls and guide rolls (5), is supported by supporting means (7), which are likewise inclined in the running direction of the conveyor (6). Supporting means (7) are in contact with force measuring devices (10) via force transmitting elements (9). By the expression inclination an upward as well as a downward inclination of the conveyor (6) or supporting means (7) with respect to their running direction is to be understood. Force transmitting elements (9) are preferably held in their position by means of frictionless guide elements (8) and holding means (11).

According to a special embodiment (not shown) the conveyor is inclined in a first section in upward and in a second section in downward direction and supported by a support (7) in both section. At the end of the measuring distance a device (3), for example an ejector, can be arranged to sort out the faulty packages. On both sides of support (7) supporting elements (4) for the conveyor (6) can be provided for, in order to avoid sagging of the conveyor in the measuring zone.

Numeral (1) indicates the package. By suitably positioned light barriers (2) or the like care is taken that the package is weighed exactly when it has reached a determined position with respect to support (7). As force measuring devices (10) electronic load cells with high natural frequency proved to be especially suitable.

A package (1) the content of which consists, for example, of a bottle (12) and a dosing spoon (13) lies on a conveyor belt (6) inclined upward with respect to the direction of motion of the belt by an angle $\alpha$. The bottle (12) and the spoon (13) in the package (1) are not fixed by any additional packing material. When, for example, the spoon in the package is missing, the bottle can move in the package. The angle of inclination $\alpha$ of the conveyor belt is chosen in such a manner that bottle (12) is able to change its position in the package by sliding or rolling.

In some cases, it may be recommended first to pass the package over the measuring distance, for example with ascending of weight again on a second measuring distance with descending inclination, such as for example the device of FIG. 2 (wherein reference numerals corresponding to reference numerals used in FIG. 1 for similar parts are utilized), with respect to the running direction of the belt and finally to compare the two measurements. Such a comparison is necessary when, as a result of the packing procedure, the dosing spoon can lie on different sides of the bottle.

The electrical signal obtained from the load cells (10) is then processed in usual manner and as soon as a specific limit value for the packages to be controlled is reached a device (3) for ejecting the incomplete package is actuated.

What is claimed is:

1. A process for controlling as to completeness the content of closed packages wherein a plurality of packed articles are distributed over the volume of the package and not fixed therein, which process comprises the steps of moving the package along an inclined plane, measuring the distribution of weight in the package at said inclined plane by simultaneously measuring the weight of the package at at least two spaced points on said plane, and comparing the measured value of the weight distribution as determined by comparing the values of said simultaneous measurements with a specific limiting value.

2. A process as claimed in claim 1, wherein the step of measuring the distribution of weight in the package is performed with the aid of load cells.

3. A process for controlling as to completeness the content of closed packages wherein a plurality of packed articles are distributed over the volume of the package and not fixed therein, which process comprises the steps of moving the package along a first inclined plane, measuring the distribution of weight in the package on said first inclined plane, thereafter moving said package along a second inclined plane of opposite inclination, measuring the distribution of weight in the packages along said second inclined plane and comparing the two measured values with each other.

4. A process as claimed in claim 3, wherein the angle of inclination of the packages is selected according to the degree of friction of the packed articles in the package.

5. A process as claimed in claim 3, wherein the step of measuring the distribution of weight in the packages is performed with the aid of load cells.

6. A process for controlling as to completeness the content of closed packages wherein a plurality of packed articles are distributed over the volume of the package and not fixed therein, which process comprises the steps of moving the package along an inclined plane, measuring the distribution of weight in the package at said inclined plane and comparing the measured value of the weight distribution with a specific limiting value; the angle of inclination of the package being selected according to the degree of friction of the packed articles in the package.

* * * * *